United States Patent
Medeau et al.

(10) Patent No.: US 12,415,333 B2
(45) Date of Patent: Sep. 16, 2025

(54) CONTAINMENT STRUCTURE

(71) Applicant: ROLLS-ROYCE plc, London (GB)

(72) Inventors: Victor P A Medeau, London (GB);
Silvestre T Pinho, London (GB);
Lorenzo Mencattelli, London (GB);
Emile S Greenhalgh, London (GB);
Soraia Pimenta, London (GB); Paul Robinson, London (GB);
MohammadErfan Kazemi, London (GB); James A Finlayson,
Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/424,036

(22) Filed: Jan. 26, 2024

(65) Prior Publication Data
US 2024/0269958 A1 Aug. 15, 2024

(30) Foreign Application Priority Data
Feb. 10, 2023 (GB) ...................................... 2301908

(51) Int. Cl.
*B32B 5/12* (2006.01)
*B32B 7/022* (2019.01)
*F01D 25/24* (2006.01)

(52) U.S. Cl.
CPC ................ *B32B 5/12* (2013.01); *B32B 7/022* (2019.01); *F01D 25/24* (2013.01);
(Continued)

(58) Field of Classification Search
CPC ...... F01D 25/24; F05D 2300/603; B32B 5/12; B32B 7/022; B32B 2260/023;
(Continued)

(56) References Cited

U.S. PATENT DOCUMENTS 9,341,445 B2 * 5/2016 de Haas ................ F41H 5/0485
9,452,587 B2    9/2016 Kisailus et al.
(Continued)

FOREIGN PATENT DOCUMENTS

WO    2020/011989 A1    1/2020

OTHER PUBLICATIONS

Carbon Fiber Composites Ch 4 Properties of Carbon Fibers, retrieved Oct. 24, 2018 (Year: 2018).*
(Continued)

*Primary Examiner* — Nathaniel E Wiehe
*Assistant Examiner* — Jason G Davis
(74) *Attorney, Agent, or Firm* — Oliff PLC

(57) ABSTRACT

A containment structure for a propulsion device, comprising a plurality of laminates arranged in a stack for absorbing projectile impact from the propulsion device, each laminate comprising a multi-ply composite of fibre reinforcement material and matrix material. The plurality of laminates comprises a plurality of primary laminates and a plurality of secondary laminates provided in an alternating arrangement along a stacking direction S of the containment structure. The primary laminates comprise a first fibre reinforcement material and the secondary laminates comprises a second fibre reinforcement material. The first fibre reinforcement material has a higher elongation to failure than the second fibre reinforcement material.

18 Claims, 6 Drawing Sheets

(52) U.S. Cl.
CPC ... *B32B 2260/023* (2013.01); *B32B 2260/046* (2013.01); *B32B 2262/106* (2013.01); *B32B 2307/54* (2013.01); *B32B 2307/56* (2013.01); *B32B 2603/00* (2013.01); *F05D 2300/603* (2013.01)

(58) Field of Classification Search
CPC .......... B32B 2260/046; B32B 2307/54; B32B 2307/56; B32B 2603/00
See application file for complete search history.

(56) References Cited

U.S. PATENT DOCUMENTS

| | | |
|---|---|---|
| 10,655,500 B2 * | 5/2020 | Heeter ................... B32B 5/02 |
| 11,376,812 B2 | 7/2022 | McCarville et al. |
| 2015/0118036 A1 | 4/2015 | Ohtani et al. |
| 2021/0316528 A1 | 10/2021 | McCarville et al. |
| 2021/0317751 A1 | 10/2021 | Mee et al. |
| 2021/0339499 A1 * | 11/2021 | Mencattelli ............ B32B 5/024 |

OTHER PUBLICATIONS

PBO Fiber Zylon Technical Information (Year: 2005).*
Carbon Fiber Composites Ch 4 Properties of Carbon Fibers: Table 4.9, retrieved Oct. 24, 2018 (Year: 2018).*
Jun. 13, 2024 Extended Search Report issued in European Patent Application No. 24151872.9.
Aug. 18, 2023 Combined Search and Examination Report issued in British Patent Application No. 2301908.6.

* cited by examiner

CONTAINMENT STRUCTURE

CROSS-REFERENCE TO RELATED APPLICATIONS

This specification is based upon and claims the benefit of priority from United Kingdom patent application number GB 2301908.6 filed on Feb. 10, 2023, the entire contents of which is incorporated herein by reference.

BACKGROUND

Field of the Disclosure

The present disclosure relates to a containment structure for a propulsion device, and in particular relates to an alternating arrangement of laminates comprising fibre reinforcement material for absorbing projectile impact.

Description of the Related Art

It is known to provide containment structures for propulsion devices, such as gas turbine engines. Containment design especially focusses on containment of an ejected fan blade or other projectile debris that may interact with the fan, typically located towards a front of a propulsion device.

It is also known to use composite materials for propulsion devices, including fan blades and containment structures. Such composite structures are considered to provide opportunities for reducing weight, especially in the containment.

Separate from such use of composite materials for containment structures, it is known to provide composite materials in various forms, often characterized by the manufacturing method or lay-up structure for the composite material. For example, it is known to provide lay-ups of uni-directional plies, two dimensional or three-dimensional weaves. It is also known to provide helicoidal ply structures, as noted in U.S. Pat. Nos. 9,452,587 and 11,376,812.

SUMMARY OF THE DISCLOSURE

According to a first aspect there is disclosed a containment structure for a propulsion device, comprising a plurality of laminates arranged in a stack for absorbing projectile impact from the propulsion device, each laminate comprising a multi-ply composite of fibre reinforcement material and matrix material;
wherein the plurality of laminates comprises a plurality of primary laminates and a plurality of secondary laminates provided in an alternating arrangement along a stacking direction of the containment structure;
wherein the primary laminates comprise a first fibre reinforcement material and the secondary laminates comprises a second fibre reinforcement material;
wherein the first fibre reinforcement material has a higher elongation to failure than the second fibre reinforcement material.

It may be that the second fibre reinforcement material has a higher elastic modulus than the first fibre reinforcement material.

The primary laminates may be referred to as high ductility laminates, which is a relative definition by reference to the first fibre reinforcement material having a higher elongation to failure than the second fibre reinforcement material of the secondary laminates.

The secondary laminates may be referred to as high stiffness laminates, which is a relative definition by reference to the second fibre reinforcement material having a higher elastic modulus than the first fibre reinforcement material of the primary laminates.

It may be that, of all fibre reinforcement material in each primary laminate, the first fibre reinforcement material constitutes between 60 wt %-100 wt %, for example 75 wt %-100 wt % or 90 wt %-100 wt %.

It may be that, of all fibre reinforcement material in each secondary laminate, the second fibre reinforcement material constitutes between 60 wt %-100 wt %, for example 75 wt %-100 wt % or 90 wt %-100 wt %.

It will be understood that the term "elongation to failure" (otherwise known as "strain to failure", "ultimate elongation" or "ultimate tensile strain") is a standard measure of the ductility of a material, i.e. the amount of strain the material can support before fibre failure during tensile testing. The elongation to failure of a material is determined as the strain at which a sample of the material subject to tensile loading fails and is measured in units of percentage strain, for example, according to ASTM D3039.

It will be understood that the term "elastic modulus" refers to the tensile modulus, i.e. Young's modulus, when measured in tension. The tensile modulus for a material is determined as the ratio of stress to strain along the axis of a sample of the material to which a tensile force is applied, measured at relatively low strains such that Hooke's law applies (i.e. in the linear region of a stress-strain plot), for example, according to ASTM D3039.

It may be that the first fibre reinforcement material has an elongation to failure at least 25% greater than the second fibre reinforcement material, for example at least 50% greater, or at least 100% greater.

It may be that the elongation to failure of the first fibre reinforcement material is 2% or more, and that the elongation to failure of the second fibre reinforcement material is less than 2%.

It may be that the second fibre reinforcement material has an elastic modulus at least 5% greater than the first fibre reinforcement material, for example at least 10% greater, or at least 25% greater.

It may be that the primary laminates each have a helicoidal ply structure, in which a clocking angle between successive plies throughout the helicoidal ply structure is 30° or less.

A helicoidal ply structure as referenced herein relates to a ply structure in which each ply defines a fibre orientation, and in which the fibre orientation is angularly offset between adjacent plies by a clocking angle. The clocking angle may be constant through a series of plies or all plies of the helicoidal ply structure. The fibres in each ply may be uni-directional (UD), with the fibre orientation corresponding to the longitudinal direction of the uni-directional fibres.

It may be that the clocking angle is 3°-30°, for example 3°-20°. It may be that for a thin ply laminate in which each ply has a thickness of 0.1 mm or less the clocking angle is 3°-10°, and that for a thick ply laminate in which each ply is 0.1 mm or more the clocking angle is 10° or more, for example 10°-30°.

It may be that the secondary laminates each have a helicoidal ply structure, in which a clocking angle between successive plies throughout the helicoidal ply structure is 45° or less, for example 30° or less.

It may be that the clocking angle is 3°-30°, for example 3°-20°. It may be that for a thin ply laminate in which each ply has a thickness of 0.1 mm or less the clocking angle is 3°-10°, and that for a thick ply laminate in which each ply is 0.1 mm or more the clocking angle is 10° or more, for example 10°-30°.

It may be that at least one laminate having a helicoidal ply structure has a turning angle through a thickness of the ply of 180°.

It may be that the plurality of primary laminates together provide a primary ply set; wherein the fibre orientations of the plies within the primary ply set are configured so that the primary ply set is balanced. It may be that for at least one of the primary laminates, the respective set of plies within the primary laminate is unbalanced.

It may be that the primary ply set is symmetrical. The property of being symmetrical has a well-defined meaning in the art, corresponding to the fibre orientations of a set of plies being mirrored either side of a central plane or central ply (for example fibre orientations of −30, −20, −10, 0, −10, −20, −30). As the primary ply set is interleaved with secondary laminates, it is to be noted that the property of being symmetrical applies to the primary ply set when considered in isolation, ignoring any spaces or interleaved plies not belonging to the primary ply set, including those of any secondary laminates.

It may be that the plurality of secondary laminates together provide a secondary ply set; wherein the fibre orientations of the plies within the secondary ply set are configured so that the secondary ply set is balanced. It may be that for at least one of the secondary laminates, the respective set of plies within the primary laminate is unbalanced.

It may be that the secondary ply set is symmetrical.

It may be that the first fibre reinforcement material and the second fibre reinforcement material are selected from the materials appearing in the following index list, with the first fibre reinforcement material appearing before the second fibre reinforcement material in the index list, the index list comprising: ultra-high-molecular-weight-polyethylene fibre; PBO fibre; glass fibre; aramid fibre; and carbon fibre.

The containment structure may extend along a longitudinal axis between a baseline zone and a reinforcement zone, each zone having a multi-ply laminate structure. The reinforcement zone may comprise the alternating arrangement of primary laminates and secondary laminates. At least some of the secondary laminates may extend from the baseline zone into the reinforcement zone. At least some of the primary laminates may be only provided in the reinforcement zone.

It may be that all of the primary laminates are only provided in the reinforcement zone. In other words, it may be that each of the primary laminates terminates in the reinforcement zone and does not extend into the baseline zone.

It may be that for each primary laminate only provided in the reinforcement zone and provided between adjacent secondary laminates: the respective secondary laminates diverge from each other along the longitudinal direction from the baseline zone to the reinforcement zone, to accommodate the primary laminate.

It may be that the containment structure is for a propulsion device having a fan and a bypass duct, wherein the reinforcement zone is configured to extend around the fan and the baseline zone is configured to extend around the bypass duct.

It may be that the stack of laminates further comprises a core laminate comprising a multi-ply composite of fibre reinforcement material and matrix material. It may be that core laminate is inboard of the alternating arrangement of primary and secondary laminates, or the core laminate forms a terminal primary or secondary laminate of the alternating arrangement. The core laminate may comprise the second fibre reinforcement material. The core laminate may have a helicoidal ply structure. The core laminate may have a thickness greater than each of the laminates in the alternating arrangement of high ductility laminates and high stiffness laminates.

The helicoidal ply structure of the core laminate may be balanced and may be symmetrical. The plies of the core laminate may form part of the primary ply set (when the core laminate comprises the first fibre reinforcement material), which may be balanced and may be symmetrical. Alternatively, the plies of the core laminate may form part of the secondary ply set (when the core laminate comprises the second fibre reinforcement material), which may be balanced and may be symmetrical.

The containment structure may further comprise an impact layer inboard of the stack of laminates with respect to an impact direction of the containment structure. The core laminate may be disposed between the impact layer and the alternating arrangement of primary laminates and secondary laminates. The impact region may comprise a plurality of metal layers; and/or a cellular structure.

It may be that the impact layer has a lower density than the stack of laminates.

The cellular structure may comprise open or closed cells. The cellular structure may be a honeycomb type structure, for example formed has an expanded honeycomb.

It may be that the impact region provides up to 15% of a total thickness of the impact region and the stack of laminates; and/or the impact region may provide up to 35% of a total mass of the impact region and the stack of laminates.

It may be that the containment structure extends around a central longitudinal axis and is configured to receive projectile impact along an inner to outer direction with respect to the longitudinal axis.

According to a second aspect there is provided a propulsion device having a fan and a core, comprising a containment structure in accordance with the first aspect.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF DRAWINGS

Embodiments will now be described by way of example only, with reference to the Figures, in which.

DETAILED DESCRIPTION OF THE DISCLOSURE

Figure 1:
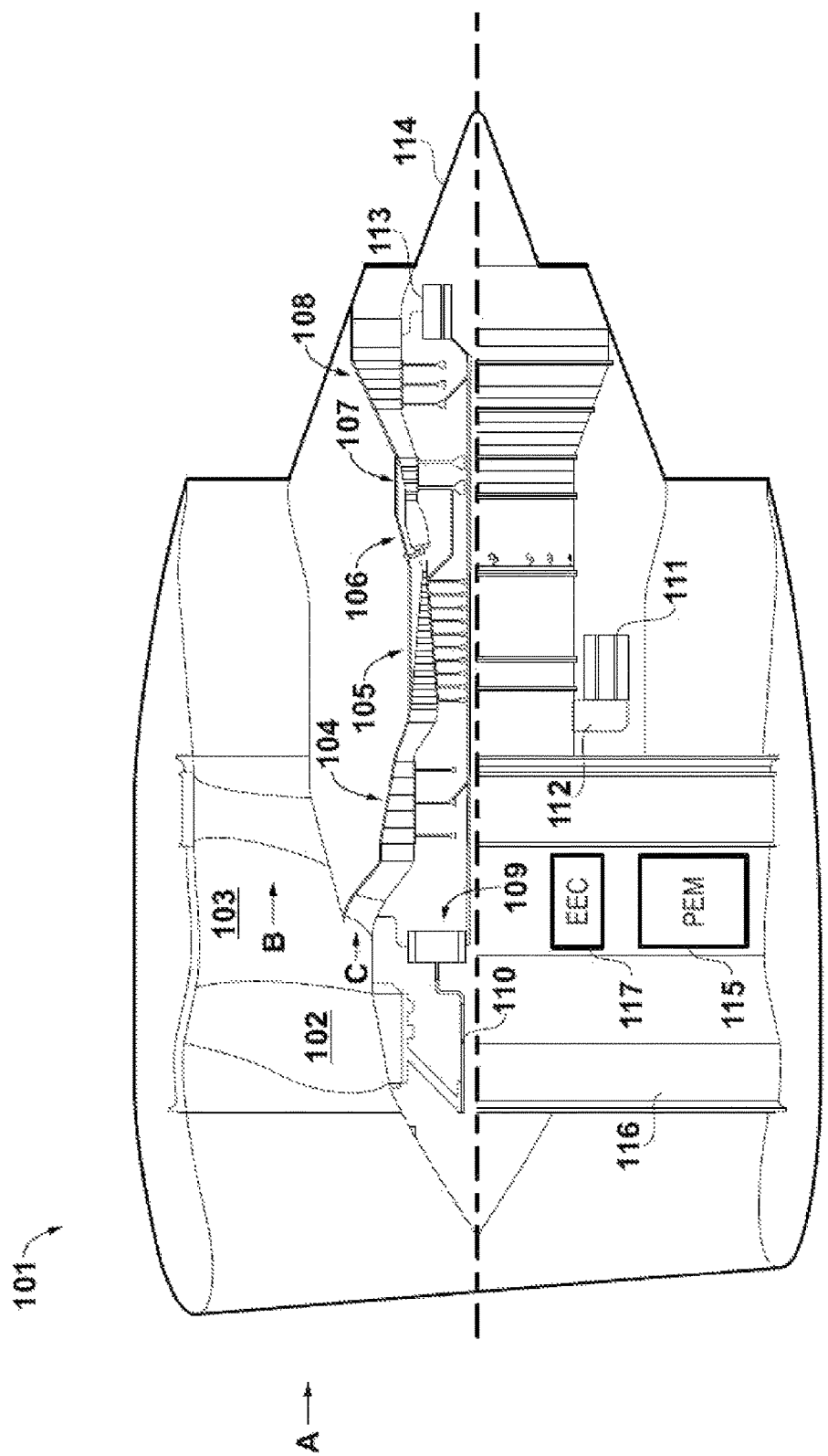
FIG. 1 schematically shows a cross-sectional view of a propulsion device, specifically a gas turbine engine.

A general arrangement of propulsion device, in particular an engine 101 for an aircraft, is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

Those skilled in the art will appreciate that the gas turbine engine 101 described above may be regarded as a 'more electric' gas turbine engine because of the increased role of the electric machines 111, 113 compared with those of conventional gas turbines.

Nevertheless, the present disclosure relating to containment structures is equally applicable to propulsion devices which do not compromise one or more of the components relating to the functionality of the electric machines (e.g. the electric machines 111, 113; the EEC 117 and/or the power electronics module 115).

Figure 2:
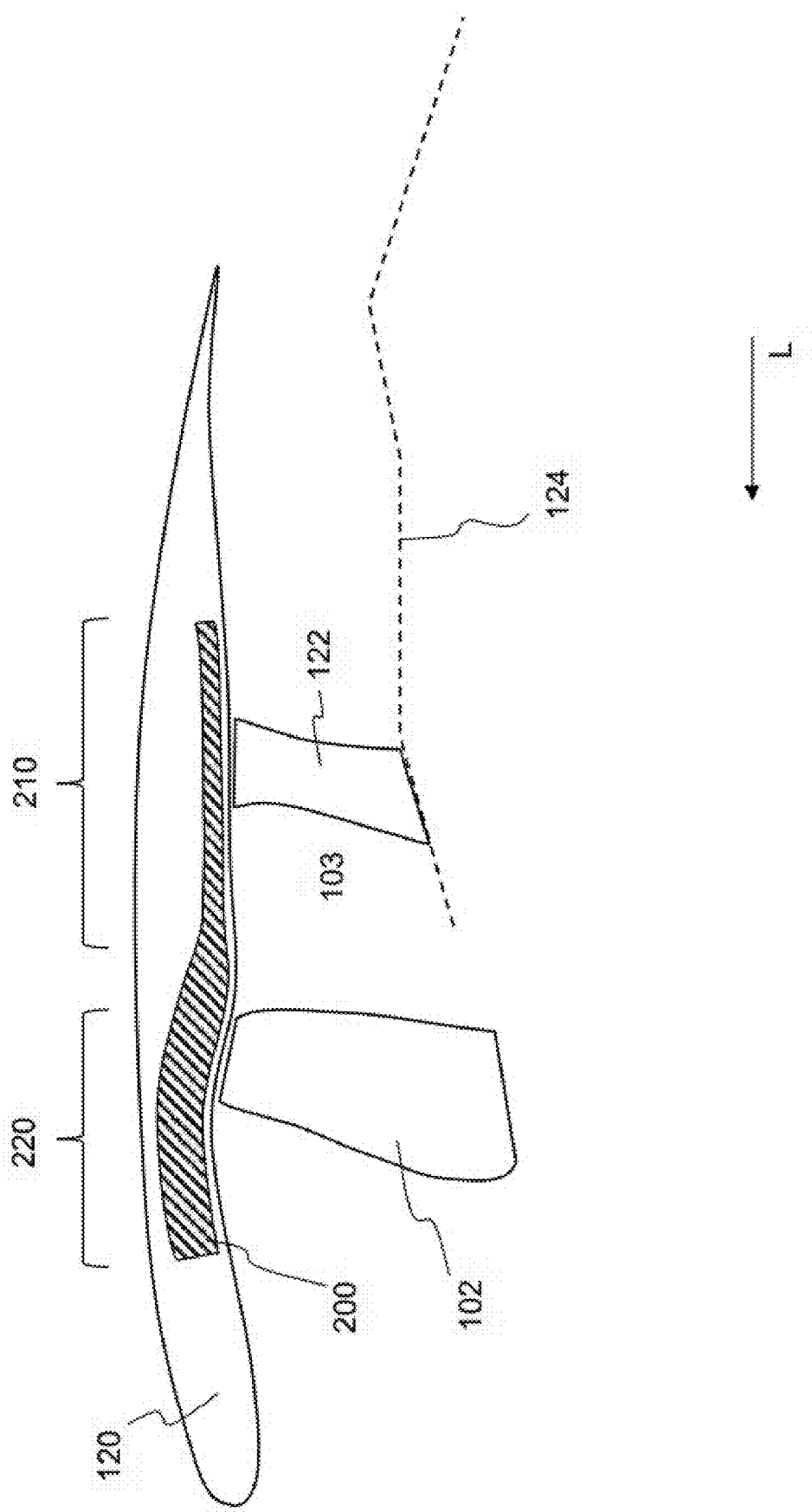
FIG. 2 schematically shows a cross-sectional view of a containment structure within a nacelle.

FIG. 2 schematically shows a cross-sectional view of a containment structure 200 in an installed location within a nacelle 120 of a propulsion device, such as the gas turbine engine 101 of FIG. 1. The nacelle 120 encloses the fan 102 and the bypass duct 103, which is aft of the fan 102 and defined between the nacelle 120 and a core fairing 124. In the example of FIG. 2, support structures such as structural outlet guide vanes 122 extend between the core fairing 124 and the nacelle 120.

The example containment structure 200 may be annular, extending around the nacelle (noting that the containment structure need not be axisymmetric). In the example of FIG. 2, the containment structure 200 has at least two zones at respective axial locations (wherein axial refers to an axis of the propulsion device corresponding to rotation of one or more shafts, such as a shaft driving the fan 102, indicated by the axis L in FIG. 2). The two zones include a baseline zone 210 and a reinforcement zone 220. The baseline zone 210 is disposed axially aft of the reinforcement zone 220, at an axial location corresponding to the bypass duct 103. The reinforcement zone 220 is disposed at an axial location corresponding to the fan 102.

It is considered that potential impact events for containment are generally of a higher energy at an axial location corresponding to the fan 102, for example fan-blade-off events, or impact events associated with debris impacting the fan. Accordingly, impact resilience requirements for a containment structure may vary between axial zones, with a zone surrounding the fan being configured to withstand higher energy events than an axially aft zone surrounding the bypass duct. Such zones are referred to herein as the baseline zone and the reinforcement zone, with the naming of these zones associated with the reinforcement zone being reinforced relative to the configuration of the baseline zone, for withstanding higher energy events.

As schematically shown in FIG. 2, the reinforcement zone 220 may have a greater radial thickness than the baseline zone 210 to provide the reinforcement.

It is considered that different materials and techniques may be applied for manufacturing the baseline zone as compared with the reinforcement zone, considering the different nature of potential impact events. For example, relatively inexpensive materials and/or techniques may be applied for the baseline zone while still meeting structural requirements, and relatively more advanced and/or expensive materials and/or techniques may be applied for the reinforcement zone. The expressions "expensive"/"inexpensive" do not necessarily relate to the actual cost of techniques and related commercial considerations, but are intended as an indicator of a category of related technical considerations, including material availability, complexity/simplicity of material provision, storage and manufacture, complexity/simplicity of manufacture (which may relate to the availability of automated vs human processes, equipment complexity and availability).

The inventors have considered that structural integrity of a containment structure is promoted if there is some consistency or commonality between the substructures making up the respective zones, for example with substructures being common between the zones. Aspects of the present disclosure relate to this object, in particular by permitting sub-structures of one type (e.g. those associated with the baseline zone) to be incorporated into a compound structure, including further sub-structures of another type (e.g. to withstand higher energy impact events in the reinforcement zone).

Figure 3:
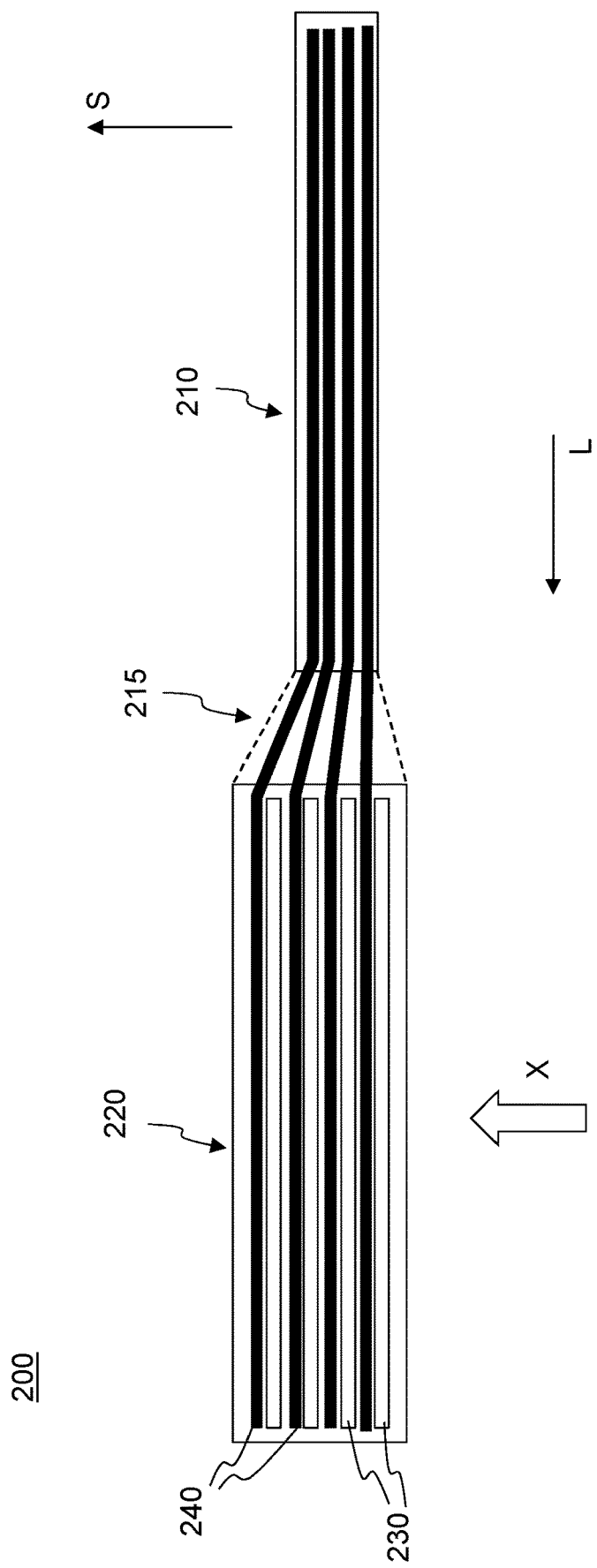
FIG. 3 schematically shows a cross-sectional view of a laminate arrangement in the containment structure.

FIG. 3 schematically shows an alternating arrangement of laminates along a stacking direction S, in the containment structure 200 of FIG. 2. Each laminate comprises a multi-ply composite of fibre reinforcement material and matrix material. In the example of FIG. 3, the laminates are of two different types, referred to herein as primary laminates 240 and secondary laminates 230. The primary laminates 230 each comprise a first fibre reinforcement material, whereas the secondary laminates each comprise a second fibre reinforcement material. The first fibre reinforcement material has a higher elongation to failure than the second fibre reinforcement material. Accordingly, the primary laminates may be referred to as high ductility laminates.

In this example, the laminates further differ from one another in that the second fibre reinforcement material has a higher elastic modulus than the first fibre reinforcement material, and as such may be referred to as high stiffness property. However, in other examples fibre reinforcement materials with similar elastic modulus (stiffness) and differing elongation to failure (ductility) may be used.

As shown in FIG. 3, the secondary laminates 240 extend along the axial direction L from the baseline zone 210 into the reinforcement zone 220, where they are interleaved with the primary laminates 230 to form the alternating arrangement of laminates in the reinforcement zone 220. While all of the secondary laminates 240 extend between the zones in this way, in other examples some of the secondary laminates 240 in the reinforcement zone may not extend from the baseline zone. Similarly, while none of the primary laminates 230 extend outside of the reinforcement zone 220 in the example of FIG. 3, in other examples some of the primary laminates may do so (e.g. they may extend into the baseline zone).

The secondary laminates 240 may diverge from each other along the axial direction L from the baseline zone to the reinforcement zone, to accommodate the primary laminate, as shown in FIG. 3. This divergence may occur in either or both of the baseline zone and the reinforcement zone, or in an intermediate zone 215 as shown in FIG. 3. Such divergence in isolation may reduce a local fibre volume fraction, but it is to be appreciated that additional fibre reinforcement material may be provided between the diverging laminates to maintain local fibre volume fraction, for example by gradually building up a ply thickness of the primary laminates 240, or by laying additional fibre reinforcement material of another type during manufacturing between the diverging laminates.

By extending the secondary laminates from the baseline zone 210 to the reinforcement zone 220, elements of the containment structure 200 are common between the respective zones which is considered to improve structural integrity of the reinforcement structure, as compared with providing separate, unlinked laminates of different types.

It is considered to be desirable to use the second fibre reinforcement material (e.g. a relatively more stiff material) for the baseline zone. Relatively stiffer materials are preferred for structural applications since they tend to deform less under load (corresponding to a relatively higher elastic modulus (Young's modulus)), and may therefore form the main components providing rigidity to a structure.

In contrast, relatively more ductile materials (e.g. the first fibre reinforcement material) are characterized by a greater elongation to failure, and as such are less prone to sudden failure than stiffer and more brittle materials. More ductile materials (e.g. the first fibre reinforcement material) are considered to provide a more controlled and progressive failure mechanism, permitting a greater final strain (before failure) so as to withstand (e.g. absorb) a larger energy, before failing.

Example materials are discussed elsewhere in the disclosure.

Further, a number of advantages are associated with the provision of the additional fibre reinforcement material (i.e. of the primary laminates 230) in the alternating arrangement.

The primary laminates comprise the first fibre reinforcement material having a relatively higher elongation to failure, which provides advantages associated with absorbing an impact as is discussed elsewhere herein. Providing fibre reinforcement material of a different type in the reinforcement zone enables the advantages associated with that material choice to be provided, whilst still retaining the advantages of a different fibre reinforcement material appropriate for the baseline zone (e.g. a less expensive fibre reinforcement material as discussed above), and permitting elements of the containment structure to be common between the zones as discussed above.

By providing the two different laminates in an alternating arrangement, as opposed to providing them in only two separate layers, enables the primary laminate to be disposed closer to a point of impact on the containment structure (i.e. at an earlier point along an impact direction X, as indicated in FIG. 3). Consequently, on the basis that the primary laminate provides advantageous effects associated with withstanding impacts on and through the containment structure, these effects can occur earlier along a trajectory of impact along the impact direction X when using the alternating structure, as opposed to providing the primary laminate at an outer position in the stack.

By providing an alternating arrangement of the primary laminates and secondary laminates, there may be an alternating bias to different failure mechanisms throughout the containment structure during an impact event. For example, shear plugging or penetration failure mechanisms may more easily propagate through a secondary laminate than a primary laminate, and may be interrupted or inhibited at the interface with a primary laminate (which may be relatively more resistant to shear plugging or penetration failure). For example, better resistance to shear plugging failure in the primary laminates may cause stress to be redistributed over a relatively larger area, thereby inhibiting damage in adjacent secondary laminates. The primary laminates may be biased to a failure mechanism based on diffuse damage (as opposed to localized damage in the form of large cracks or widespread fibre cutting), and this may serve to increase a shear plug diameter (i.e. for increased energy dissipation) or prevent shear plugging failure. For example, the primary laminates may be configured to favour a mixture of damage modes to inhibit shear plugging failure (e.g. some shear failure, some tensile failure, crushing, formation of a relatively large number of relatively smaller cracks, as opposed to formation of larger cracks and delamination)

Additionally or alternatively, the different material composition of the primary and secondary laminates may cause the dynamic response of adjacent primary and secondary laminates to differ during an impact event, such that energy tends to be absorbed at the interface by delamination between the adjacent laminates.

By way of example, the different and alternating failure mechanisms may have a compound effect of more rapidly arresting or limiting damage associated with an impact event. While particular failure mechanisms are discussed in more detail in the further disclosure, a brief example may be given as follows.

Impact acting on a primary laminate may cause energy to be absorbed in the primary laminate by formation of small cracks in the structure (e.g. along controlled or predetermined crack paths), and relatively small or localized delamination between fibres (where relative references are as compared with impact on the secondary laminate under the same loading). The primary laminate may serve to widen an area over which the impact causes deformation in the primary laminate through the thickness of the laminate (e.g. along a radial direction or stacking direction), for example from an impact region on an inner side of the primary laminate which is in direct contact with a deformed region of an inboard layer, to an impact region on an outer side of the primary laminate which is deformed and contacts an outer secondary laminate. The expansion of the impact area (or impact region) through the primary laminate lowers the impact pressure upon the secondary laminate, which is therefore better able to resist impact. The different material properties between the primary and secondary laminates causes them to strain at different rates (and/or in different directions) at the interface between the laminates, which promotes delamination between the laminates. This delamination absorbs energy, and further extends the impact area subject to deformation in the secondary laminate. The secondary laminate may be more biased (relative to the primary laminate) to failure mechanisms such as shear plug failure and fibre cutting. At the outer interface with the adjacent primary laminate, the shear plug failure is stopped, given the differing failure mechanism in the primary laminate (e.g. energy dissipation to form small cracks, and relatively small or localized delamination, as mentioned above). It should be noted that the above description is an example of possible failure mechanisms and how the provision of alternating layers can act together to dissipate energy and arrest an impacting projectile. The combination of primary and secondary laminates provide a containment structure configured to delay critical fibre failure (e.g. inhibiting fibre cutting/shearing) and to promote non-critical energy-dissipating failures (example matrix cracking, fibre-matrix debonding, and delamination), and to cause such failure modes over a relatively wider area to reduce loading and prevent critical fibre failure (e.g. especially in the secondary laminates which may be more susceptible to critical fibre failure under the same loading). These mechanisms prevent localized failure and promotes wide-scale energy absorption for containment.

A primary laminate may better permit resilient deformation and thereby act to absorb and contain deformation associated with an inner secondary laminate during an impact event, and this may inhibit a failure mechanism in the secondary laminate based on fibre breakage and rupture of the secondary laminate. The expression "inner" herein relates to the orientation of the containment arrangement with respect to the impact direction along which a projectile may be received.

It may be that the alternating arrangement of primary and secondary laminates is advantageous even if a stack comprising only the primary laminates provides better impact-resisting behaviour than a stack comprising the alternating arrangement of primary and secondary laminates. This may be because advantages associated with (i) use of the secondary laminates away from the reinforcement zone (e.g. in the baseline zone), and (ii) extending the structure of the baseline zone into the reinforcement zone for structural performance of the containment structure as a whole, outweigh (iii) the poorer impact-resisting performance of the secondary laminates as compared with the primary laminates.

Figure 4:
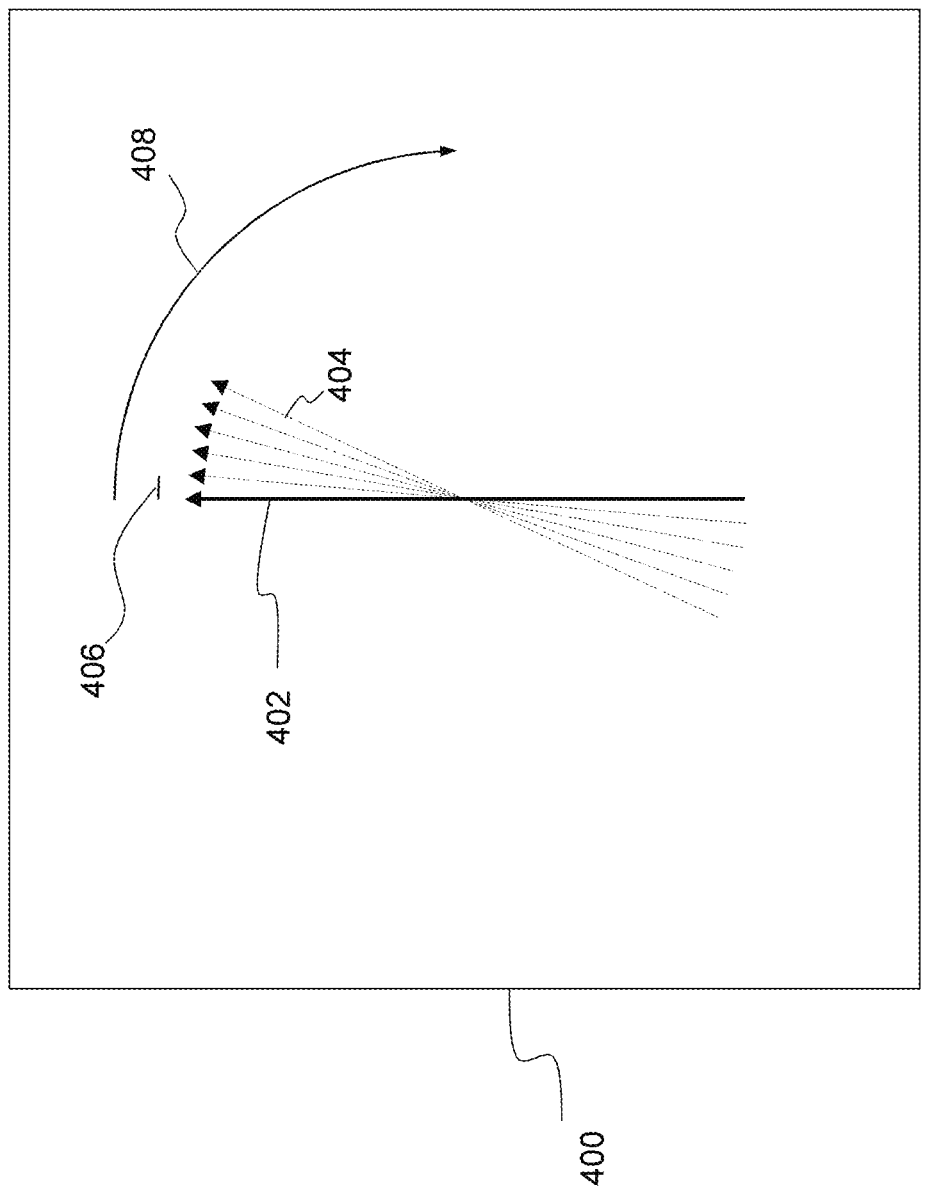
FIG. 4 schematically illustrates a helicoidal ply structure.

FIG. 4 schematically illustrates a portion of a ply 400 of an example laminate (e.g. a primary laminate or secondary laminate as discussed herein) and is presented for the purpose of describing concepts relating to helicoidal ply structures. As is known in the art, ply structures in which each ply comprises unidirectional fibre reinforcement material (e.g. as applied through techniques such as automatic fibre placement (AFP), automatic tape laying (ATL) and others) are conventionally arranged in a stack (or "lay-up") to form a laminate. The plies may be arranged so that, fibre orientation (i.e. the angle along which the unidirectional fibres extend) differs between the plies. For example, known arrangements use common angular offsets between adjacent plies such as 45°, 60° or 90°.

In contrast, a helicoidal ply structure is one in which the adjacent are angularly offset by a relatively lower angle, referred to herein as a clocking angle. It may be that the clocking angle is 3°-45°, for example 3°-30°, or 3°-20°. It may be that for a thin ply laminate in which each ply has a thickness of 0.1 mm or less the clocking angle is 3°-10°, and that for a thick ply laminate in which each ply is 0.1 mm or more the clocking angle is 10° or more, for example 10°-30°.

FIG. 4 shows a 0° fibre orientation for the ply 400 with solid arrow 402, with fibre orientations for successive plies (i.e. applied in sequence in the stack) indicated by dashed arrows 404. The clocking angle between the respective fibre orientations is indicated by numeral 406, and in the example of FIG. 4 is 5°.

FIG. 4 also indicates a turning angle 408, which in this example is 90°. The turning angle corresponds to the angle through which the fibre orientations turn between the extreme plies in the laminate (i.e. the lowest and uppermost plies).

In the context of absorbing energy from an impact load, there are benefits of a helicoidal ply structure. These benefits may be best discussed by contrast to a conventional ply structure having large angular offsets between plies (e.g. 45° or more). In such a conventional ply structure, the elastic deformation response differs significantly between adjacent plies owing to the different fibre orientations. Accordingly, under an impact load adjacent plies in the ply structure deform at different rates in respective directions, causing large scale delamination between the plies. Further, the overlapping nature of the fibres does not generally permit the impact (e.g. a projectile) to form a crack structure that persists through multiple layers, resulting in fibre cutting to dissipate energy. Instead, loading which causes a matrix crack between fibres in a first ply (e.g. in a 0° ply) tends to cause fibre failure in the adjacent ply (e.g. at 45° or 90°), as the angular offset between plies is too large for a matrix crack to propagate without fibre failure. These failure mechanisms correspond to formation of a shear plug, where the impact load cuts fibres and drives a plug of the ply structure through the structure to dissipate energy.

In contrast, in a helicoidal ply structure, the relatively smaller clocking angle tends to promote localized small crack formation over successive layers of the ply structure. The localized cracks tend to follow a helical profile corresponding to the clocking angle through the ply structure. This both inhibits fibre cutting, and also prevents cracks from propagating towards each other for more general rupture of the laminate. Adjacent layers have more similar elastic responses to the impact load, such that major delamination is inhibited. Accordingly the helicoidal ply structure (as compared with a conventional ply structure as described above) tends to better absorb impact loads and resist shear plugging failure.

The primary and secondary laminates of the examples described herein may each comprise a helicoidal ply structure.

Ply structures may have the property of being balanced and may also have the property of being symmetrical. Both properties have well defined meanings in the art. The property of being balanced relates to there being plies with corresponding (equivalent) fibre orientations of opposing sign within a set of plies. For example, for each ply having a fibre orientation of 20°, there should be a corresponding ply having a fibre orientation of −20°. The property of being balanced is associated with several advantages, including the prevention of forming defects (such as warping or non-linear twisting), and providing a structure with predictable load couplings in respective directions and/or the absence of undesirable load couplings (e.g. twist around the Z axis having an undesirable coupling with bending relative to a Y axis).

The property of being symmetrical corresponds to the fibre orientations of a set of plies being mirrored either side of a central plane or central ply (for example fibre orientations of −30, −20, −10, 0, −10, −20, −30).

It is also desirable to have fibre orientations distributed throughout the range 0-180° (not necessarily an equal distribution), which is referred to herein as a full circuit distribution.

In the context of a helicoidal ply structure, the inventors considered that to achieve the properties discussed above (notably balance, and the full circuit distribution), with a relatively low clocking angle, a relatively large set of plies may be necessary (i.e. a set with a relatively large number of plies). The inventors have considered that the advantages associated with these properties can nevertheless be retained even when the respective set of plies is divided into separate laminates.

Figure 5A:
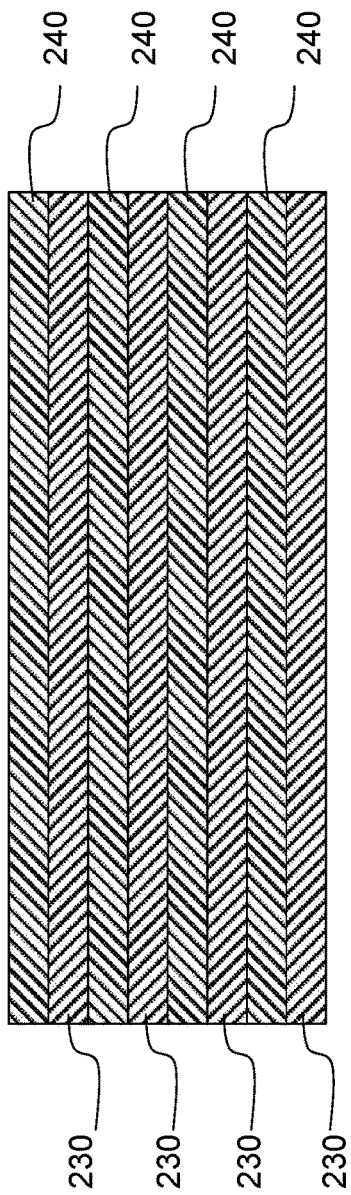
FIGS. 5a and 5b schematically illustrate an alternating arrangement of primary and secondary laminates.
Figure 5B:
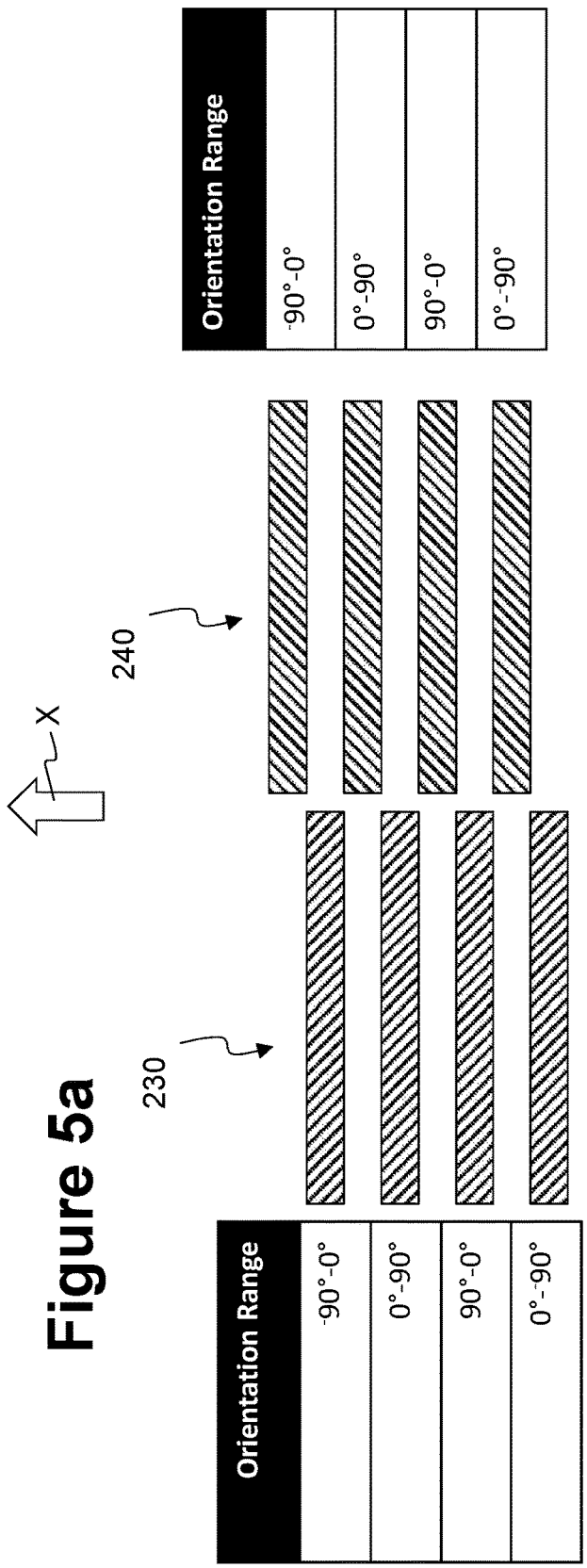

FIG. 5a schematically shows an example stack of primary and secondary laminates 230, 240 in an alternating arrangement. FIG. 5b shows the same stack in an exploded (non-physical) view to illustrate how the plurality of primary laminates 230 can be considered to comprise a primary ply set, and the plurality of secondary laminates 240 can be considered to comprise a secondary ply set.

The tables adjacent to each respective ply set indicate the fibre orientation range in each respective laminate. In this example, the primary ply set comprises four primary laminates 230 that together provide a balanced primary ply set, which in this example is also a symmetrical ply set. In this example, each primary laminate 230 has a turning angle of 90°, with the primary laminates having respective fibre orientation ranges (from a top (outer) position to a bottom (inner) position) of −90° to 0°; 0° to 90°, 90° to 0° and 0° to −90°. Accordingly the top two laminates together provide a turning angle of 180° along a first helicoidal direction, and the bottom two laminates together provide a turning angle of 180° along a second opposing helicoidal direction.

The secondary primary set has a similar set of secondary laminates, having a similar breakdown of turning angles and fibre orientations.

In the example of FIG. 5b, the fibre orientations between primary laminate and an adjacent secondary laminate differ at selected interfaces (in particular by 90°). This may promote energy absorption by delamination at the interface between the respective laminates. However, the disclosure also envisages that there may be no difference in the fibre orientation at such interfaces (and delamination would still occur owing to the different elastic response provided by the different material types).

Although the turning angle in each respective laminate in the above example is 90°, other turning angles are possible and may be provided in other implementations. For example, the turning angle may be 180°, or 60°. The turning angle for the or each laminate may be in the range 30°-180°. The turning angle for the or each laminate may be greater than 180°, whether an integer multiple of 180° or not.

Figure 6:
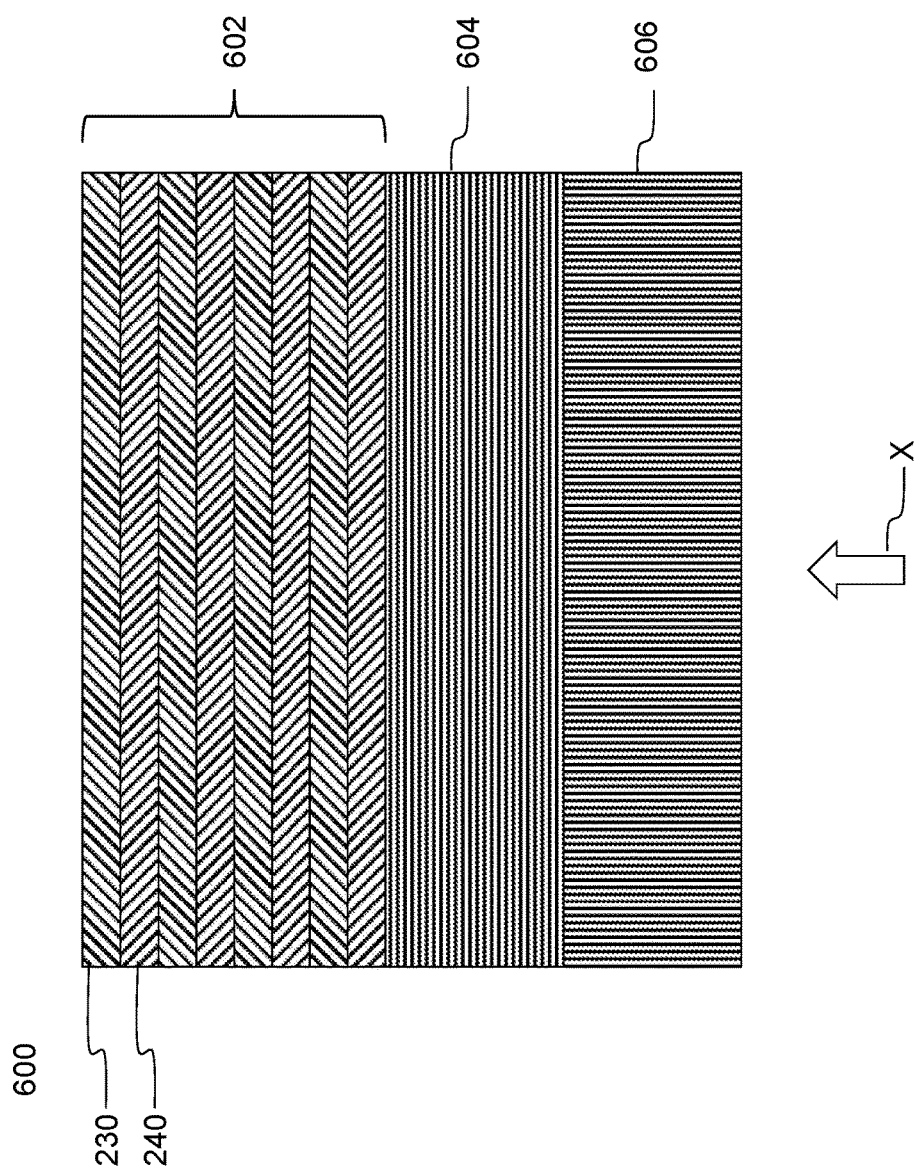
FIG. 6 schematically illustrates a containment structure.

FIG. 6 shows a containment structure 600 comprising an alternating arrangement 602 of primary and secondary laminates 230, 240 in accordance with the examples described above at an outer position, an optional impact region 606 at an inner position, and an optional core laminate 604 disposed between the alternating arrangement and the impact region. The expressions inner and outer are defined with respect to the impact direction X (i.e. with a projectile travelling along an inner to outer direction).

The core laminate and the alternating arrangement of primary and secondary laminates may be referred to as a stack of laminates. The core laminate may have a similar (e.g. the same) material composition as either of the primary laminates and the secondary laminates. For example, the core laminate may comprise the first fibre reinforcement material, or may comprise the second fibre reinforcement material. The core laminate may have a helicoidal ply structure as described herein.

The core laminate may have a thickness greater than any other individual laminate. It may be that the core laminate forms part of a primary ply set or secondary ply set (depending on the material composition of the core laminate), with the properties of being balanced and/or symmetrical being achieved by the respective ply set including the core laminate. The core laminate may extend from the baseline zone into the reinforcement zone as described elsewhere herein.

The impact region is configured to provide an initial impact-absorbing function, and is configured to spread an impact load over a wide area for continued deformation and impact over outboard layers.

By way of example, the impact region may comprise a plurality of metal (e.g. metallic) layers, such as titanium (or a titanium alloy), or aluminium (or an aluminium alloy). The impact region may additionally or alternatively comprise a cellular structure, for example an open or closed cellular structure. The cellular structure may be metallic (e.g. comprising titanium (or a titanium alloy), or aluminium (or an aluminium alloy). The cellular structure may comprise a composite material (e.g. a fibre reinforcement material within a matrix material), for example an aramid fibre composite, carbon fibre composite or glass fibre composite material. The cellular structure may comprise an expanded cellular structure, also known in the art as an expanded honeycomb structure.

The containment structure may comprise further regions or layers, for example one or more containment films (e.g. epoxy film) bounding on or more of the laminates and/or the impact region. The containment structure may further comprise an abradable layer configured to define a gas-washed surface of the containment structure. Otherwise, the impact region, core laminate or an inner surface of the alternating arrangement of primary and secondary laminates may form the gas-washed surface of the containment structure. The expression "gas-washed" relates to the surface which defines the bounding surface for a functional airflow of the propulsion device (e.g. the flow through the fan and/or bypass duct).

Materials

Suitable fibre reinforcement materials for the primary and secondary laminates as described herein include those set out in table 1 below. FRP is an abbreviation for "fibre reinforced polymer":

TABLE 1

| Material Category | Fibre Elastic Modulus (Young's Modulus) | UD ply Elastic Modulus (Young's Modulus) | Elongation to failure |
|---|---|---|---|
| UHMWPE FRP | 50-130 GPa | 20-75 GPa | 3-4% |
| Glass FRP | 70-85 GPa | 40-55 GPa | 2-6% |
| Aramid FRP | 70-160 GPa | 40-120 GPa | 2-3.5% |
| PBO FRP | 180-270 GPa | 90-170 GPa | 2.5-3.5% |
| Carbon FRP | 200-450 GPa | 100-200 GPa | 0.5-1.5% |

UD refers to a unidirectional ply in which the respective fibre reinforcement material is incorporated at a fibre fraction of 40-60%. The matrix material is not considered to impact the elastic modulus or elongation to failure.

UHMWPE is an abbreviation for Ultra-high-molecular-weight-polyethylene. When utilized in a laminate as described herein, the UHMWPE may be provided in fibre form within a matrix material. UHMWPE fibre is commercially available under from AVIENT Protective Materials, B.V. of the Netherlands, under the trade name Dyneema (RTM).

PBO refers to fibres of synthetic polymer, specifically poly(p-phenylene-2,6-benzobisoxazole), commercially available as Zylon (RTM) PBO, from Aramid HPM, LLC of the USA.

The order in which the materials are presented in Table 1 corresponds to an index list of associated fibre reinforcement materials (i.e. UHMWPE, glass fibre, aramid fibre, carbon fibre). The first and second fibre reinforcement materials referenced throughout this present disclosure may be selected from this index list, with the first fibre reinforcement material appearing first in the index list before the second fibre reinforcement material. Other definitions as to parametric differences between the first and second fibre reinforcement materials as defined herein may apply simultaneously (e.g. definitions with respect to elongation to failure, and/or with respect to elastic modulus).

Example

A series of control panels for comparison were manufactured. The control panels consist of 6 mm thick CFRP having a 0/60/-60 sequence of fibre orientations through the panel. The control panels were manufactured using prepreg (fibre reinforcement material pre-impregnated with matrix material) CFRP.

The set of control panels were formed from a prepreg CFRP material having a thickness of 0.025 mm. Each panel has a through-thickness ply count of 240 plies. The prepreg material is available from SK Chemicals of South Korea under the SKYFLEX name. The particular material used for the second set of control panels is USN020A K51 Prepreg. A corresponding series of compound panels (i.e. comprising an alternating arrangement of primary and secondary laminates) were manufactured.

The compound panels comprise primary laminates comprising PBO and secondary laminates comprising the same CFRP material as used in the comparable control panel. The primary laminates and secondary laminates each used prepreg fibre reinforcement materials having a 38%-40% resin content, and with similar resin densities of between 1.21-1.23 g/cm3. As noted below, the panels were produced to target a common areal weight, and given the similar resin content and resin densities, it can be determined that the fibre weight fraction of the laminates are suitable for comparative testing of the panels.

The primary laminates comprise 41 plies comprising PBO with an approximate ply thickness of 0.025 mm, laid up with a clocking angle of 5° to form primary laminates having a thickness of approximately 1 mm. The secondary laminates comprise 19 plies of CFRP, with a ply thickness of approximately 0.025, laid up with a clocking angle of 5°, resulting in a thickness of the secondary laminates of approximately 0.48 mm. There are 3 primary laminates and 5 secondary laminates in an alternating arrangement.

The control panels and compound panels were cured in an autoclave. The autoclave parameters were based on the manufacturer's directions for a curing cycle. The curing cycle includes a 2°/min ramp up to 70° C. at 5 bar pressure (gauge), dwell time for 30 min, ramp up to 125° C. at 2° C./min, dwell for 90 min, and cool down. After curing, test specimens with a size larger than a test zone were cut and weight-checked, with tested panels having a weight ranging from 0.7 to 1.12 g/cm2. The test zone refers to the zone of the panel supported by 4 ball-bearing contacts for testing, with the test specimens being larger than the test zone (at 150×100 m or 250×250 mm, with the larger size being used for CFRP panels to inhibit delamination at the edge of the panels affecting panel performance at the test zone). Non-destructive testing (using C-scan ultrasonic inspection equipment) was conducted to verify that test samples were free of forming defects.

Testing was conducted to determine the energy absorbed by the panels. In each test, a high velocity impact gas-gun (HVI gun). The HVI gun used is a single-stage gas gun, with a 70 mm barrel diameter. Each test panel was mounted on a test frame providing support via 4 ball-bearing contacts, with the panel held in a vertical orientation by elastic retainers. The HVI gun fired steel balls of 14 mm diameter horizontally with impact velocities ranging from 140 to 300 m/s.

The tests were observed using high speed cameras (the Vision Research Phantom V7.3 High-Speed Camera available from the Phantom/Ametek division of Vision Research Inc, USA) mounted above and to the side of the test panels. An impact velocity and a residual velocity (in the event of perforation) was determined.

For perforated panels, an absorbed energy was determined based on a difference between the impact kinetic energy and the residual kinetic energy of the projectile. A specific energy absorption was determined by normalizing to the areal weight (i.e. the weight per area, e.g. 0.95 g/cm2).

The impact testing demonstrated a 133% increase in specific absorbed energy between the control and compound panels (from 110 J/(g/cm2) to 260 J/(g/cm2). Panel testing was conducted at a range of impact velocities (i.e. below and above ballistic limit corresponding to ejection of the projectile), to determine the ballistic limit.

Helicoidal control panels were also tested, having the same configuration as the control panels noted above but with a helicoidal arrangement of plies corresponding to that described above for the compound panels. The helicoidal control panels provided an intermediate value of specific absorbed energy, of 130 J/(g/cm2).

Similar testing was conducted for ply structures based on thicker plies. A set of control panels were formed from a prepreg CFRP material having a thickness of 0.25 mm. Each panel has a through-thickness ply count of 24 plies. For corresponding compound panels, the primary laminates comprise 28 plies comprising PBO with an approximate ply thickness of 0.045 mm, laid up with a clocking angle of 7° to form primary laminates having a thickness of approximately 1 mm. The secondary laminates comprise 7 plies of CFRP with a ply thickness of approximately 0.25, laid up with a clocking angle of 30°, resulting in a thickness of the secondary laminates of approximately 1.75 mm. There are 2 primary laminates and 2 secondary laminates in an alternating arrangement. Impact testing demonstrated a 77% increase in specific absorbed energy (from 140 J/(g/cm2) to 250 J/(g/cm2)). Again, helicoidal control panels provided an intermediate improvement of specific absorbed energy (180 J/(g/cm2)).

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems.

We claim:

1. A containment structure for a propulsion device, comprising a plurality of laminates arranged in a stack for absorbing projectile impact from the propulsion device, each laminate comprising a multi-ply composite of fiber reinforcement material and matrix material;
    wherein the plurality of laminates comprises a plurality of primary laminates and a plurality of secondary laminates provided in an alternating arrangement along a stacking direction of the containment structure;
    wherein the primary laminates comprise a first fiber reinforcement material and the secondary laminates comprises a second fiber reinforcement material;
    wherein the primary laminates each have a helicoidal ply structure, in which a clocking angle between successive plies throughout the helicoidal ply structure is 30° or less; and
    wherein the first fiber reinforcement material has a higher elongation to failure than the second fiber reinforcement material.

2. The containment structure of claim 1, wherein the second fiber reinforcement material has a higher elastic modulus than the first fiber reinforcement material.

3. The containment structure of claim 1, wherein the elongation to failure of the first fiber reinforcement material is at least 25% greater than the elongation to failure of the second fiber reinforcement material.

4. The containment structure of claim 1, wherein the second fiber reinforcement material has an elastic modulus at least 5% greater than the first fiber reinforcement material.

5. The containment structure of claim 1, wherein the secondary laminates each have a helicoidal ply structure, in which a clocking angle between successive plies throughout the helicoidal ply structure is 45° or less.

6. The containment structure of claim 5, wherein the plurality of secondary laminates together provide a secondary ply set;
    wherein the fiber orientations of the plies within the secondary ply set are configured so that the secondary ply set is balanced; and
    wherein for at least one of the secondary laminates, the respective set of plies within the primary laminate is unbalanced.

7. The containment structure of claim 1, wherein at least one of the primary laminates having the helicoidal ply structure has a turning angle through a thickness of the ply of 180°.

8. The containment structure of claim 1, wherein the plurality of primary laminates together provide a primary ply set;
    wherein the fiber orientations of the plies within the primary ply set are configured so that the primary ply set is balanced; and
    wherein for at least one of the primary laminates, the respective set of plies within the primary laminate is unbalanced.

9. The containment structure of claim 1, wherein:
    the first fiber reinforcement material and the second fiber reinforcement material are selected from the materials appearing in the following index list, with the first fibre-fiber reinforcement material appearing before the second fibre-fiber reinforcement material in the index list, the index list comprising:
    ultra-high-molecular-weight-polyethylene fiber; PBO fiber; glass fibre fiber; aramid fiber; and carbon fiber.

10. The containment structure of claim 1, extending along a longitudinal axis between a baseline zone and a reinforcement zone, each zone having a multi-ply laminate structure;
    wherein the reinforcement zone comprises the alternating arrangement of primary laminates and secondary laminates;
    wherein at least some of the secondary laminates extend from the baseline zone into the reinforcement zone; and wherein at least some of the primary laminates are only provided in the reinforcement zone.

11. The containment structure of claim 10, wherein for each primary laminate only provided in the reinforcement zone and provided between adjacent secondary laminates:
the respective secondary laminates diverge from each other along the longitudinal direction from the baseline zone to the reinforcement zone, to accommodate the primary laminate.

12. The containment structure of claim 10, wherein the containment structure is for a propulsion device having a fan and a bypass duct, wherein the reinforcement zone is configured to extend around the fan and the baseline zone is configured to extend around the bypass duct.

13. A propulsion device having a fan and a core, the propulsion device including the containment structure of claim 12.

14. The containment structure of claim 1, wherein the plurality of laminates further comprises a core laminate comprising a multi-ply composite of fiber reinforcement material and matrix material;
wherein the core laminate is inboard of the alternating arrangement of primary and secondary laminates;
the core laminate comprises the second fiber reinforcement material;
the core laminate has a helicoidal ply structure; and
the core laminate has a thickness greater than each of the laminates in the alternating arrangement of the primary laminates and the secondary laminates.

15. The containment structure of claim 14, further comprising an impact layer inboard of the plurality of laminates with respect to an impact direction of the containment structure,
wherein the core laminate is disposed between the impact layer and the alternating arrangement of primary laminates and secondary laminates; and
wherein the impact layer comprises at least one of (a): a plurality of metal layers; and (b) a cellular structure.

16. The containment structure of claim 15, wherein the impact layer provides up to 15% of a total thickness of the impact layer and the plurality of laminates; and
wherein the impact layer provides up to 35% of a total mass of the impact layer and the plurality of laminates.

17. The containment structure of claim 1, wherein the plurality of laminates further comprises a core laminate comprising a multi-ply composite of fiber reinforcement material and matrix material;
wherein the core laminate forms a terminal primary or secondary laminate of the alternating arrangement;
the core laminate comprises the second fiber reinforcement material;
the core laminate has a helicoidal ply structure; and
the core laminate has a thickness greater than each of the laminates in the alternating arrangement of the primary laminates and the secondary laminates.

18. The containment structure of claim 1, wherein the containment structure extends around a central longitudinal axis and is configured to receive projectile impact along an inner to outer direction with respect to the longitudinal axis.

* * * * *